(12) United States Patent
Jiang et al.

(10) Patent No.: US 6,335,043 B1
(45) Date of Patent: Jan. 1, 2002

(54) METHOD FOR EXTRACTING SOYBEAN PROTEINS USING AN ENZYME

(76) Inventors: Haokui Jiang; Hongwei Fu, both of No. 32, North Second Street, Wuchang City Heilongjiang Province 150200, P.C. (CN)

(*) Notice: Subject to any disclaimer, the term of this patent is extended or adjusted under 35 U.S.C. 154(b) by 0 days.

(21) Appl. No.: 09/631,188

(22) Filed: Aug. 2, 2000

(30) Foreign Application Priority Data

Aug. 3, 1999 (CN) .......................................... 99111244

(51) Int. Cl.[7] ................................ A23L 1/20; A23J 1/14
(52) U.S. Cl. ........................ 426/425; 426/46; 426/431; 426/634; 426/656
(58) Field of Search ................................ 426/634, 656, 426/425, 431, 46

(56) References Cited

U.S. PATENT DOCUMENTS 3,663,373 A * 5/1972 Berger et al.
3,897,570 A * 7/1975 Yokotsuka et al.
4,882,180 A * 11/1989 Takao et al.

OTHER PUBLICATIONS

Database abstract. Derwent Acc. No. 1973–15541U. For JP 73007780. Patent Assignee: Kikkoman Shoyu Co. Published 1973.*

* cited by examiner

*Primary Examiner*—Anthony J. Weier
(74) *Attorney, Agent, or Firm*—Cohen, Pontani, Lieberman & Pavane

(57) ABSTRACT

A process is described for extracting soybean proteins. The process includes the steps of: preparing a fat-free soybean meal which comprises water soluble and water insoluble proteins; separating the water soluble and the water insoluble proteins; introducing a protease to the water insoluble proteins so as to transform the water insoluble proteins to the water soluble proteins; and precipitating the water soluble proteins with an acid. The process has a better protein yield and a lower production cost than that of conventional methods because of the use of proteases. The product of this invention is superior to that made according to the conventional methods, with respect to the appearance of the product, water preservation ability, flexibility, scatter ability in water, emulsification ability, compendency, etc.

16 Claims, No Drawings

METHOD FOR EXTRACTING SOYBEAN PROTEINS USING AN ENZYME

BACKGROUND OF THE INVENTION

1. Field of the Invention

The present invention relates to a novel process of extracting proteins from soybean, and particularly to a process of extracting soybean proteins using a protease.

2. Description of the Related Art

Soybean is a type of crop containing a large amount of proteins. The proteins extracted from soybean, namely soybean proteins, contain eight essential amino acids including lysine, tryptophan and valine as well as nonessential amino acids. Soybean proteins are characterized with properties such as excellent water preservation ability, adherent ability, compendency, oil absorbability and emulsification ability. As an essential food component, soybean proteins have been widely used in producing bangers, bakemeats, cans, and the like since these proteins not only compensate the insufficiency of animal protein with respect to the amino acid components thereby improving nutritional value of meat products, but also contain less fat than animal proteins. Supplement of soybean proteins to meat products improves the flavor and water preservation ability of meat products, and makes the texture of the meat products more delicate and resilient. Also, soybean proteins alone are significant components of daily diet. In addition, soybean proteins have been widely used in feeding stuff processing, pharmaceutical and plastic industry. Therefore, preparation of soybean proteins with high yields and quality has been the focus in the production of soybean proteins.

Presently, the common method of extracting proteins from soybean throughout the world is to use alkali and acid in the process. Such method is performed generally as follows:

First, soybean proteins are precipitated from soybean by alkali and the precipitates are separated from the supernatant by supercentrifuge. Then the supernatant is neutralized with an acid to recover the remaining proteins in the supernatant.

However, the above described method suffers from the following disadvantages:

1. The precipitation of soybean proteins is incomplete using alkali such that the protein yield is low (usually below 35%) while the production cost relatively high.

2. After the acid precipitation, the supernatant still contains a significant amount of water soluble proteins, which are discarded without appropriate recycling treatment. In addition to the loss of useful proteins, the alkali and acid in the waste solution cause environmental pollution.

SUMMARY OF THE INVENTION

An object of the present invention is to provide a process of extracting soybean proteins with high protein yield.

This object of the invention is achieved by using the following process which comprises the following steps:

a. preparing a fat-free soybean meal which comprises water soluble and water insoluble proteins;

b. introducing water to said fat-free soybean meal to produce a soybean meal suspension, said soybean meal suspension comprising a first liquid phase and a first solid phase, said water soluble proteins staying in said first liquid phase and said water insoluble proteins staying in said first solid phase;

c. separating said first liquid phase and said first solid phase;

d. introducing water to said separated first solid phase to form a second suspension, said second suspension comprising a second liquid phase and a second solid phase, said water insoluble proteins staying in said second solid phase;

e. introducing a protease to said second suspension so as to digest said water insoluble proteins therein such that said water insoluble proteins become additional water soluble proteins staying in said second liquid phase;

f. separating said second liquid phase and said second solid phase; and g. precipitating said water soluble proteins and said additional water soluble proteins in said first and second liquid phases with an acid.

The present invention is advantageous over the conventional method of preparing soybean proteins in that:

(a). The protein yield according to the present invention can be improved up to 48%, about ten percent higher than that of the conventional method, because the protease used in the process enables the soybean proteins wrapped within the soybean fibers to dissolve fully in the solution.

(b). The purity of the product is higher while the production cost is lower.

(c). The concentration of soluble proteins in the discarded solution is significantly lowered in the present invention, which reduces environmental pollution.

(d). The product of present invention is improved with respect to the color, odor, water preservation ability, flexibility, dispensability, emulsification ability and compendency of the protein produced, because the present process eliminates the need for a large amount of chemicals.

The various features of novelty which characterize the invention are pointed out with particularity in the claims annexed to and forming a part of the disclosure. For a better understanding of the invention, its operating advantages, and specific objects attained by its use, reference should be had to the descriptive matter in which there are illustrated and described preferred embodiments of the invention.

DETAILED DESCRIPTION OF THE PRESENTLY PREFERRED EMBODIMENTS

The present invention is described below in more detail with reference to the following descriptions and examples.

According to the present invention, a fat-free soybean meal is prepared following methods well known to those ordinary skilled in the art. Water is added to such fat-free soybean meal to form a suspension which contains solid substances and water soluble substances, including some water soluble proteins, under the conditions that the soybean proteins are most favorably dissolved in water. A condition at a pH of about 7.0 and a temperature of about 50 to 60° C. is preferred. While the most preferred conditions are described in the following examples, the conditions for the optimal result can be easily determined by a person of ordinary skill in the art through routine experimentation.

Once the soybean meal suspension is sufficiently mixed for a sufficient period of time that can be readily determined, the solid and water soluble substances are separated. While any separation methods may be suitable for such purpose, filtration technique is preferred as it is quick, easy and economical. Any commercially available filters or sieves for separating the solid and liquid portions of the suspension may be selected depending on the sizes of the solid particles of the fat-free soybean meal, although a filter or a sieve having a pore size of 60 to 150 mesh is preferred.

The liquid portion of the suspension contains those most easily dissolved soybean proteins. After filtration this liquid portion is temporarily set aside for a later use. The solid portion from the soybean meal is mixed again with additional water to form another suspension. This time the pH and temperature are adjusted to suit a protease reaction depending on the protease selected. Then a protease, such as pepsin, papain or trypsin, is introduced into the suspension and incubated with the suspension for a period of time that sufficiently allows the protease to digest those water insoluble proteins completely, such as about 30 minutes. Alternatively, more than one protease may be applied to the suspension.

While pepsin, papain and trypsin are preferred proteases used in the present invention, many other proteases manufactured by various manufacturers, such as Beijing Biochemical Pharmaceutical Factory and Shenyang Biochemical Pharmaceutical Factory, may also be used to achieve the same object.

After the protease digestion, some of water insoluble proteins become water soluble and go into the solution. There are still some water insoluble substances left in the solid portion of the suspension. Separation of the solid portion and liquid portion of such suspension is again required and may be performed in the same way as above described.

The process, i.e. mixing the solid portion with water after it is separated from the liquid portion to form a suspension and then introducing a protease into the suspension to digest the water insoluble proteins, may be repeated as many times as desired until little soybean proteins are left in the solid portion.

The liquid portion of the suspension, whether obtained before or after protease digestion usually contains some fine fibers from soybean which can pass through the filter or sieve used in the present invention. It is preferred that such fine fibers are to be removed from the liquid portion to enhance the purity of the soybean protein product. Such fine fibers may be removed by way of centrifugation or any other methods that are routinely performed by a person of ordinary skill in the art.

The liquid portions so produced that contains the water soluble soybean proteins are then precipitated with an acid, such as HCl. The amount of the acid required depends on the ultimate pH of the solution, preferably between 4.0 to 5.0. After the acid precipitation the precipitates are collected using any suitable methods, such as for example, centrifugation. Such protein precipitates appear to be sludge like, the pH of which then adjusted to about 7.0 with an alkali so that the precipitates are neutralized. The protein precipitates so collected may be sterilized and spray-dried.

The following examples are intended to illustrate, but not to limit the scopes of, the present invention.

EXAMPLE 1

A process for extracting soybean proteins includes the following steps:

The starting material, i.e. fat-free soybean meal, which is a side product produced during preparation of soybean oil, is available commercially. Generally, it may be made by squeezing the soybean to flakes of about 0.2 to 0.3 $mm^2$ in size, extracting the oil at a temperature not more than 55° C. The method of preparing said soybean meal is a conventional technology, which is disclosed in more detail in Processing on agricultural products published by China agriculture publishing house in 1977, the content of which is hereby incorporated by reference in its entirety.

The soybean meal so prepared was then filtered with a 80-mesh shaker, after which water was added at ratio of about 10 parts of water per part of the soybean meal, by weight, to produce a suspension. The pH value of such suspension was adjusted to about 7.4 with NaOH solution and the suspension is stirred fully at a temperature of about 55° C. Afterwards, the suspension stays still for about 30 minutes at the same temperature to allow water soluble proteins to be dissolved.

The above produced suspension was then filtered with a microporosity filter having 100 to 150 mesh (manufactured by Jiangxi Qingjiang Chemical Factory,China). The liquid substance obtained from the filtration was designated as solution A which contains the water-soluble soybean proteins and carbohydrates. There were still a large amount of proteins packed within the fibers from the soybean which are not easily dissolved in the alkaline solution. Thus, additional water was added to the solid part after the filtration at a the same ratio as described above and mixed with the solid to produce solution B.

After the pH value of the solution B was adjusted to about 7.0, about 0.3% pepsin, by weight, (from Nanjing Biochemical Pharmaceutical Factory,China) was added to the solution B. Solution B was mixed with pepsin fully and kept at about 50° C. for about 20 to 30 minutes, in order to digest the remaining insoluble proteins that remain in the solid part.

The protease-digested solution B was then filtered with the same microporosity filter as used above. The liquid part after the filtration was solution C, which contained additional water-soluble proteins.

The solution A was then combined with solution C and this combined solution was centrifuged at 7,000 revolutions per minute (r.p.m.) to remove those fine soybean fibers, which passed through the filter of 100–150 mesh and left within the solutions A and C.

The pH of the supernatant obtained from the centrifugation was adjusted with HCl (hydrochloric acid) to about 4.5 in order to precipitate the proteins in the liquid. The supernatant was then centrifuged at 4500 r.p.m. in a S4D-3/408 centrifuge to collect the precipitates. The precipitates so produced are desired soybean proteins, which is in a sludge emulsion state.

The pH value of the soybean protein precipitates was then adjusted to about 7.0. After sterilization at high temperature as well as high pressure (the inlet temperature is 175° C. to 185° C., the outlet temperature is 85° C. to 95° C., the pressure is about 0.7 MPa), the soybean precipitates was dried with spraying technique, which yielded about 55% of the final product.

EXAMPLE 2

The process described in EXAMPLE 1 may be modified with respect to the following steps:

In the early step of the process, i.e. the step of dissolving the fat-free soybean meal in an alkaline solution, the soybean meal is filtered through a 60-mesh shaker to separate the liquid and the solid. Water is then added to the solid in a ratio of about 15 parts of water per part of soybean meal, by weight, and mixed with the solid to form a suspension. The pH value of such suspension is adjusted to 7.0, and the suspension is kept at 50° C. for 20 minutes.

After the filtration with a microporosity filter having 100 to 150 mesh (manufactured by Jiangxi Qingjiang Chemical Factory,China), the liquid obtained from the filtration is designated as solution A while the solid is mixed with water at a water to solid ratio of about 1:15 by weight to produce solution B.

About 0.036% papain by weight, from Wuxi Biochemical Pharmaceutical Factory,China, is added and the enzymatic reaction is performed at 70° C. for 30 minutes after adjusting the pH value of the solution B to about 7.4.

The papain-digested solution B is then filtered with the same microporosity filter as used above. The liquid part from the filtration is solution C, which contains additional water soluble proteins.

The solution A is then combined with solution C and this combined solution was centrifuged at 7,500 revolutions per minute (r.p.m.) to remove those fine soybean fibers, which passes through the filter of 100–150 mesh and left within the solutions A and C.

The pH of the supernatant is adjusted to about 4.3 with an acid such as HCl and centrifuged at 4,600 rpm in a DBP500/38-22-30 centrifuge.

The remaining steps afterwards are the same as those in EXAMPLE 1.

EXAMPLE 3

In another embodiment, the process described in EXAMPLE 1 may also be modified with respect to the following steps:

In the early step of the process, i.e. the step of dissolving the fat-free soybean meal in an alkaline solution, the soybean meal is filtered through a 70-mesh shaker to separate the liquid and the solid. Water is then added to the solid in a ratio of 1:12 by weight and mixed with the solid. The pH value of such suspension is adjusted to 8.0, and the suspension is kept at 60° C. for 25 minutes.

After the filtration with a microporosity filter having 100 to 150 mesh (manufactured by Jiangxi Qingjiang Chemical Factory,China), the liquid obtained from the filtration is designated as solution A while the solid is mixed with water at a water to solid ratio of about 1:12 by weight to produce solution B.

About 0.44% trypsin by weight, from Yangzhou Biochemical Pharmaceutical Factory,China, is added and the enzymatic reaction is performed at 60° C. for 20 minutes after adjusting the pH value of the solution B to about 7.4.

The trypsin-digested solution B is then filtered with the same microporosity filter as used above. The liquid part from the filtration is solution C, which contains the water-soluble proteins.

The solution A is then combined with solution C and this combined solution was centrifuged at 8,000 r.p.m. to remove those fine soy bean fibers, which passes through the filter having 100–150 mesh and left within the solutions A and C.

The pH of the supernatant is adjusted to about 4.6 with an acid such as HCl and centrifuged at 4,550 rpm in a DBP500/38-22-30 centrifuge.

The remaining steps afterwards are the same as those in EXAMPLE 1.

The invention is not limited by the embodiments described above which are presented as examples only but can be modified in various ways within the scope of protection defined by the appended patent claims.

We claim:
1. A method of extracting proteins from soybean, comprising the steps of:
   a. preparing a fat-free soybean meal which comprises water soluble and water insoluble proteins;
   b. introducing water to said fat-free soybean meal to produce a soybean meal suspension, said soybean meal suspension comprising a first liquid phase and a first solid phase, said water soluble proteins staying in said first liquid phase and said water insoluble proteins staying in said first solid phase;
   c. separating said first liquid phase and said first solid phase;
   d. introducing water to said separated first solid phase to form a second suspension, said second suspension comprising a second liquid phase and a second solid phase, said water insoluble proteins staying in said second solid phase;
   e. introducing a protease to said second suspension so as to digest said water insoluble proteins therein such that said water insoluble proteins become additional water soluble proteins staying in said second liquid phase;
   f. separating said second liquid phase and said second solid phase;
   g. adding an acid to said first or said second liquid phases or the combination thereof to produce protein precipitates; and
   f. collecting said protein precipitates.

2. The method of claim 1, wherein said first and second liquid phases, and said first and second solid phases are separated by filtration.

3. The method of claim 1, further comprising the steps of neutralizing said collected protein precipitates with an alkali.

4. The method of claim 1, wherein said protease digestion is performed at a pH of 7.0 to 7.4 and a temperature of 45 to 70° C.

5. The method of claim 1, wherein the amount of said protease is in a range of 0.036 to 0.44% by weight.

6. The method of claim 1, wherein said protease is selected from the group consisting of pepsin, papain and trypsin.

7. The method of claim 6, wherein about 0.3% of said pepsin, by weight, is incubated with said water insoluble proteins at a temperature of about 50° C. and a pH of about 7.0 for about 30 minutes.

8. The method of claim 6, wherein about 0.036% of said papain, by weight, is incubated with said water insoluble proteins at a temperature of about 70° C. and a pH of about 7.4 for about 30 minutes.

9. The method of claim 6, wherein about 0.44% of said trypsin, by weight, is incubated with said water insoluble proteins at a temperature of about 60° C. and a pH of about 7.4 for about 20 minutes.

10. The method of claim 1, wherein said water soluble proteins or said additional water soluble proteins or the combination thereof are precipitated at a pH of about 4.3 to 4.6.

11. The method of claim 1, wherein about 10 to 15 parts of water are introduced to one part of said soybean meal or said first solid phase at a pH of about 7.0 to 8.0 and a temperature of about 50 to 60° C.

12. A method of extracting proteins from soybean, comprising the steps of;
   a. preparing a fat-free soybean meal which comprises water soluble and water insoluble proteins;

b. introducing water to said fat-free soybean meal at a ratio of about 10 to 15 parts of water per part of said fat-free soybean meal, a pH of about 7.0 to 8.0 and a temperature of about 50 to 60° C., to produce a soybean meal suspension, said soybean meal suspension comprising a first liquid phase an a first solid phase, said water soluble proteins staying in said first liquid phase and said water insoluble proteins staying said first solid phase;

c. separating said first liquid phase and said first solid phase by filtration, said first liquid phase after filtration contains fine fibers;

d. introducing water to said separated first solid phase at a ratio of about 10 to 15 parts of water per part of said separated first solid phase to form a second suspension, said second suspension comprising a second liquid phase and a second solid phase, said water insoluble proteins staying in said second solid phase;

e. introducing a protease elected from the group consisting of pepsin, papain and trypsin to said second suspension so as to digest said water insoluble proteins therein such that said water insoluble proteins become additional water soluble proteins staying in said liquid phase, said protease digestion being performed at a pH of 7.0 to 7.4 and at a temperature of 45 to 70° C.;

f. separating said second liquid phase and said solid phase by filtration, said second liquid phase after filtration contains fine fibers;

g. removing said fine fibers form said first and second liquid phases by centrifugation;

h. adding an acid at a pH of about 4.3 to 4.6 to said first or said second liquid phases or the combination thereof to produce protein precipitates;

i. collecting said protein precipitates; and j. neutralizing said collected protein precipitates with an alkli.

13. The method of claim 12, wherein the amount of protease for digestion is in a range of 0.036 to 0.44% by weight.

14. The method of claim 12, wherein about 0.3% of said pepsin, by weight, is incubated with said water insoluble proteins at a temperature of about 50° C. and a pH of about 7.0 for about 30 minutes.

15. The method of claim 12, wherein about 0.036% of said papain, by weight, is incubated with said water insoluble proteins at a temperature of about 70° C. and a pH of about 7.4 for about 30 minutes.

16. The method of claim 12, wherein about 0.44% of said trypsin, by weight, is incubated with said water insoluble proteins at a temperature of about 60° C. and a pH of about 7.4 for about 20 minutes.

* * * * *